United States Patent [19]

Phillips

[11] 3,943,065

[45] Mar. 9, 1976

[54] NON-COLLOIDAL POLYAMIC ACID ELECTRODEPOSITION COMPOSITIONS

[75] Inventor: David C. Phillips, Pittsburgh, Pa.

[73] Assignee: Westinghouse Electric Corporation, Pittsburgh, Pa.

[22] Filed: Oct. 12, 1973

[21] Appl. No.: 405,941

Related U.S. Application Data

[63] Continuation-in-part of Ser. No. 245,397, April 19, 1972, abandoned.

[52] U.S. Cl.............. 252/500; 106/288 R; 204/181
[51] Int. Cl.².......................................... H01B 1/00
[58] Field of Search..................... 252/500; 204/181

[56] References Cited
UNITED STATES PATENTS 3,652,355   3/1972   Herrick.......................... 204/181 X
3,702,813   11/1972  Tanaka et al....................... 204/181
3,766,117   10/1973  McQuade....................... 204/181 X
3,846,269   11/1974  Martello et al.................... 204/181

Primary Examiner—Benjamin R. Padgett
Assistant Examiner—E. Suzanne Parr
Attorney, Agent, or Firm—D. P. Cillo

[57] ABSTRACT

A conducting electrodeposition composition contains a resinous polymer dissolved in concentrations to the saturation point in a balanced solvent system of two miscible liquids, one of the liquids being a solvent for the polymer and the other being a non-solvent for the polymer.

16 Claims, No Drawings

NON-COLLOIDAL POLYAMIC ACID ELECTRODEPOSITION COMPOSITIONS

CROSS REFERENCE TO RELATED APPLICATIONS

This application is a continuation-in-part of application U.S. Pat. Ser. No. 245,397, filed on Apr. 19, 1972, now abandoned.

BACKGROUND OF THE INVENTION

When a direct current potential is applied across an emulsion, suspension or solution containing charged particles or molecules, the latter migrate toward the electrode bearing the opposite charge. This phenomenon is generally called electrophoresis and is utilized to apply coatings onto metallic surfaces for purposes of electrical insulation, paint priming, weather protection, and the like.

Most of the polymer electrophoretic deposition techniques followed in industry involve aqueous systems. However, aqueous depositions are in general markedly affected and vitiated by the evolution of gases at the electrodes.

This is particularly true where polymer particles in a colloid or polymer molecules in a solution have a relatively low conductance. To cause such particles to migrate to and deposit on an electrode may require relatively high voltage which, in turn, causes the water to be electrolyzed and causes the evolution of hydrogen and oxygen as gases. This gas evolution, deriving from water electrolysis can result in heavily pitted polymer coatings, which makes them particularly unsuitable for electrical insulation. Moreover, water emulsion systems are generally plagued by difficult-to-control surface tension, necessary pH conditions, and viscosity difficulties.

Polyimide resins have recently come into use as high temperature electrical insulating films. Polymidide films are generally produced by film casting of a non-aqueous solvent solution followed by a heat cure. Briefly, this involves dissolving a suitable soluble polyamic acid precursor polymer in a solvent, casting the solution uniformly upon a smooth surface and then slowly heating until a suitable polyimide insulating film is produced from the acid polymer derivative. A major problem with the solution casting method is that only relatively thin films (0.0001 inch for foil coatings) can be produced in a single coat. Heavier coating or film thickness requires a multicoat system with each coat being dried and cured before applying the subsequent coat. Difficulty is also encountered with uniform coating of corners and particularly of sharp edges. Polyimide coverage of irregular-shaped objects has proved impossible by solution casting and expensive equipment costs are encountered in this method.

As a partial answer, electrophoretic deposition techniques have been developed for polyamic acids in a water emulsion system, as described in U.S. Pat. No. 3,537,970. Such an aqueous polymer electrodeposition system, however, still suffers the aforedescribed disadvantages of film pitting. Although most of the polymer electrophoretic deposition techniques applied in industry involve aqueous processes, a few organic systems, such as those shown in U.S. Pat. Nos. 3,450,655 and 3,463,714, have also been used. These systems have involved particulate colloidal suspensions of vinyl resins, epoxy resins, and carboxyl-containing polymers and copolymers such as polyacrylic acid, vinyl acetate/maleic acid copolymers, ethylene/itaconic acid copolymers and ethylene/maleic acid copolymers among others. Preparation of salt solutions of some of the foregoing carboxylcontaining polymers is described in U.S. Pat. No. 3,463,714 but the solutions are then converted into suspensions, and it is the suspended colloidal particles which are then electrodeposited.

It has been found that a great number of variables exist in non-aqueous electrodeposited systems as regards the ratio between polymer and solvent and between solvents within the solvent system, but that each polymer and system used presents its own characteristic problems in its dilution or suspension and deposition.

SUMMARY OF THE INVENTION

In accordance with this invention, it has been found that the foregoing difficulties may be overcome, so that exposed portions of regular and irregular-shaped electrical conductors can be uniformly heavily coated with good edge coverage and without pitting, in a single coating operation, by the electrodeposition of a resin from a homogeneous, non-colloidal solution containing a resinous polymer, preferably a salt, dissolved up to saturation point in an organic solvent system of two miscible liquids, one of said liquids being a solvent for the salt and the other liquid being a non-solvent for the salt. This solution is electrically conducting and the solution has preferably a maximum concentration of the polymer so that it is essentially saturated. The coating operation will preferably involve the electrodeposition of a salt of a polyamic acid from a non-aqueous composition followed by imidizing, generally by a heat cure to produce the corresponding polyimide. This preferred composition comprises a solute formed from a polyamic acid polymer and a nitrogen containing base in a dual solvent system consisting of a liquid, organic, non-aqueous solvent for the acid, which is preferably nonelectrolizable, and a liquid, organic, non-aqueous, nonelectrolizable non-solvent for the salt of the acid. The particular preferred composition components have a critical solvent to non-solvent balance. Polyamic acid salt is present in amounts which will form a non-colloidal solution.

DESCRIPTION OF THE PREFERRED EMBODIMENTS

One of the preferred cured imide films, after electrodeposition of polyamic acid polymer and subsequent heating in accordance with this invention comprises polymers of aromatic polyimides having the recurring unit:

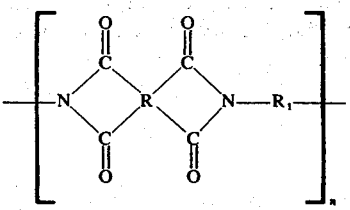

wherein $n$ is at least 15, R is at least one tetravalent organic radical selected from the group consisting of:

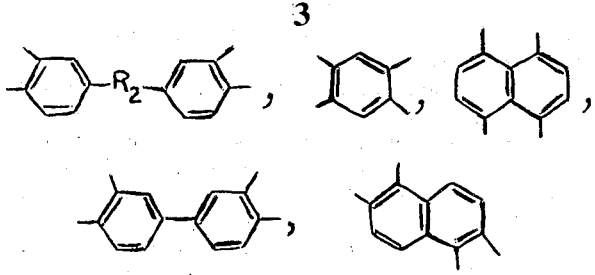

and

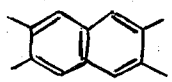

$R_2$ being selected from the group consisting of divalent aliphatic hydrogen radicals having from 1 to 4 carbon atoms and carbonyl, oxy, sulfo and sulfonyl radicals and in which $R_1$ is at least one divalent radical selected from the group consisting of:

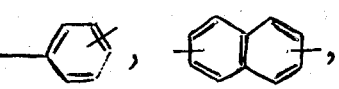

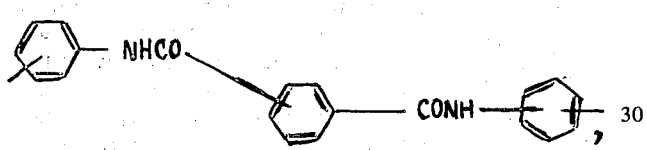

and

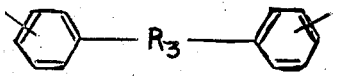

in which $R_3$ is a divalent organic radical selected from the group consisting of $R_2$, silico and amido radicals. Polymers containing two or more of the R and/or $R_1$ radicals, especially multiple series of $R_1$ containing amide radicals, are particularly valuable in some instances. The aromatic polyamide-imide resins, represented by certain of the foregoing formulae are described and claimed in U.S. Pat. No. 3,179,635.

The described, essentially insoluble, cured, high temperature films are derived from certain resinous materials in solvent solution. In the present invention a resinous salt is provided in a dual organic solvent system. The precursor film after application to a suitable metallic or other type electrically conductive substrate by electrodeposition methods is heated for a time sufficient to cure the precursor film to its solid resinous state.

In general, the soluble polyamic acid precursors, which are the preferred materials of this invention, are prepared by admixing a suitable aromatic tetracarbox- ylic dianhydride with an aromatic diamine in a suitable solvent at room temperature. The admixture or solution is stirred until a maximum viscosity is reached. Examples of suitable dianhydrides are pyromellitic dianhydride, benzophenone tetracarboxylic dianhydride, naphthalene tetracarboxylic dianhydride and the like. Examples of suitable diamines are m-phenylene diamine, methylene dianiline, diaminodiphenyl ether, diaminobenzanilide and the like. References which describe the procedure in greater detail are U.S. Pat. Nos. 3,179,635; 3,179,614; 3,179,631; 3,179,632; 3,179,633 and 3,179,634. The polyamic acid precursors are well known and commercially available in solvent solutions.

The same general procedure is employed when a derivative of an aromatic tricarboxylic anhydride, e.g. trimellitic anhydride chloride or the ester diacid chloride of trimellitic anhydride is used in place of the aforesaid aromatic dianhydride. The above-named diamines are also suitable for use with the tricarboxylic anhydride derivatives.

One of the aromatic polyamic acid polymers suitable for use as a soluble polyamide acid precursor in this invention has the recurring unit:

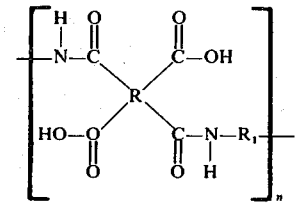

in which $n$ is at least 15 and R and $R_1$ are identical to the description hereinabove relating to the solid aromatic polyimide and polyamide-imide resins. It should be understood that suitable polyamic acids may also contain two or more or the R and/or $R_1$ radicals.

Suitable solvents for the polyamic acids are aprotic solvents, i.e. solvent which will neither lose a proton to the solute nor gain a proton from the solute, for example, the normally liquid organic solvents of the N,N-dialkylcarboxylamide class, preferably the lower molecular weight members of this class, such as dimethyl acetamide, dimethyl formamide, and N-methyl-2pyrrolidone. Other useful aprotic solvents include dimethyl sulfoxide and pyridine. The solvents can be used individually or in combinations of two or more. The solvents are easily removed by heating in a drying tower or oven.

In addition to the aforementioned aromatic polyimide and polyamide-imide recurring unit wherein R was a tetravalent organic radical, other cured resins which are particularly suitable as films which can be electrodeposited in accordance with this invention are derived from a trivalent anhydride and have the structure:

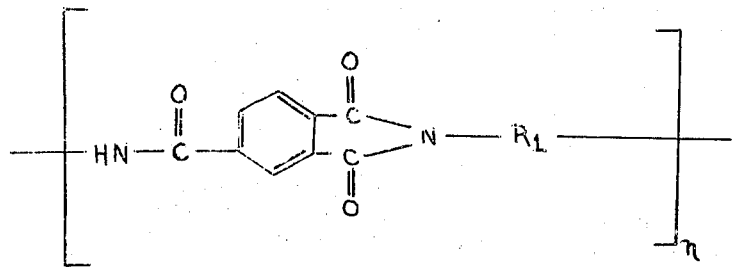

wherein $R_1$ and n are identical to the description hereinabove relating to the solid aromatic polyimide and polyamide-imide resins.

Particularly valuable films are provided when $R_1$ is:

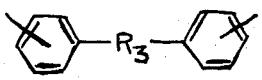

where $R_3$ is an oxy or methylene ($-CH_2-$) radical.

The soluble polyamic acid precursors for the above trivalent derived polyamide-imide resins include in repeating form one or both of the structures:

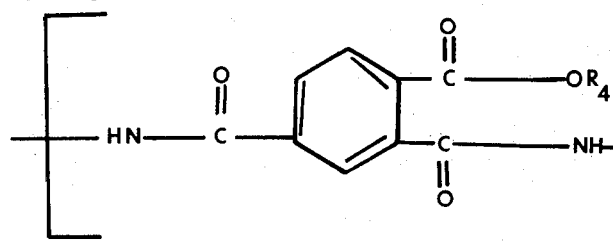

and

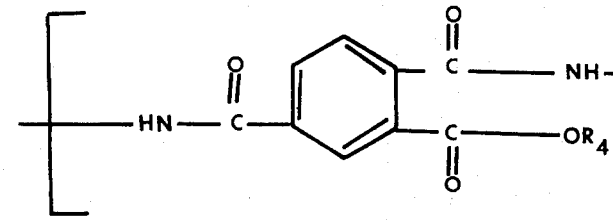

wherein $R_1$ and $n$ are identical to the description hereinabove and $R_4$ is $-H$. For details on the preparation of these soluble polyamic acids and the solid resins therefrom, reference may be had to British Patents 1,056,564 and 1,032,649. The same solvents are previously described can be used for the above aromatic polyamic acids. Copolymers of the tetravalent and trivalent anhydride compound may also be employed in polyamic acid form. Linkages other than amic acid may also be included in or on the polymer chain so long as the salt formed therefrom is conductive and has mobility sufficient to deposit from the solution.

In the process of this invention, the preferred polyamic acids have been successfully electrodeposited from non-colloidal solutions of amine salts of the same polyamic acids in mixed organic solvent systems. The preferred electrically conducting composition of this invention consists of a solution of the organic amine salt of the polyimide precursor within a critically balanced organic liquid solvent-non-solvent mixture and has a pH range between 8–10. The solids content for the electrodeposition composition is preferably between about 2–5 wt.% based on the weight of polyamic acid and total solvent-non-solvent mixture. Lower solids content, e.g. as little as about 0.5 weight percent, will work but at much slower rates of deposition.

The process is highly complex and probably involves polymer salt formation:

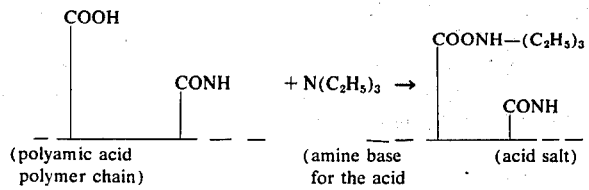

Under the influence of a voltage differential between an anode and cathode contacting a bath containing a salt in concentrations up to the saturation point in a balanced solvent system, it is envisaged that the salt ionizes to produce the triethylammonium ion and carboxyl ion of the polymer which subsequently migrate to cathode and anode respectively:

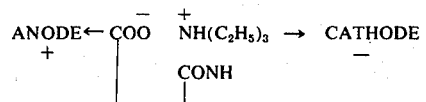
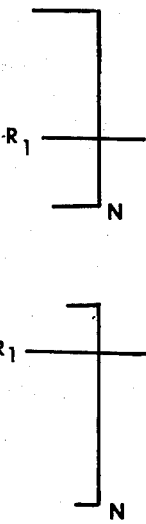

Anode reactions lead to the reconstitution of the parent polyamic acid, which on subsequent imidization, generally by a heat cure, loses water to produce the corresponding polyimide film. Possible anode reactions are:

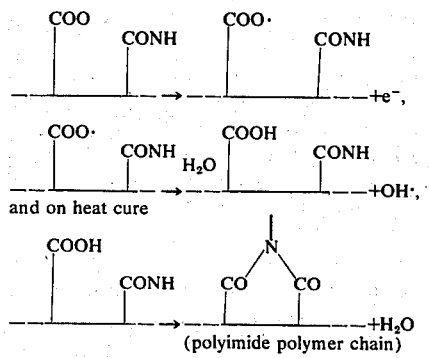

The non-aqueous liquid which is added to the acid salt solution is a non-electrolizable solvent which is not capable of dissolving the acid salt of the polymer chain. The non-solvent for the salt is added to the salt solution in an amount effective to provide an essentially saturated solution of the resinous salt. The rate of deposition will then be at its maximum and will diminish as the salt is depleted. This non-solvent for the acid salt polymer must not gas to any great extent at the electrodes due to electrolysis when a voltage is applied to the system. Preferred solvents are non-electrolizable solvents which are a non-solvent for the acid salt of the polymer and would include liquid aliphatic (straight and branched chain) and aromatic ketones, such as, for example, acetone, methyl isobutyl ketone, methyl ethyl ketone, methyl n-propyl ketone, diethyl ketone, mesityloxide, cyclohexanone, methyl n-butyl ketone, ethyl n-butyl ketone, methyl n-amyl ketone acetophenone, methyl n-hexylketone, isophorone and diisobutylketone.

The basic compounds which react with the carbonyl containing acid polymer to form an acid salt are preferably organic bases and include nitrogen containing organic tertiary aliphatic and aromatic amines such as, for example, trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmoropholine, N,N-diethylaniline, pyridine; and imidazoles such as for example, imidazole, 1-methylimidazole, 4-methylimidazole, 5-methylimidazole, 1-propylimidazole, 1,2-dimethylimidazole, 1-ethyl-2-methylimidazole and 1-phenylimidazole. These organic bases will not cause hydrolysis of the polyamic acid and single cell systems can be used whereas an inorganic base such as NaOH can hydrolyze the polyamic acid or other polymers particularly those having acidic groups and a split cell might be required to isolate the anode and cathode compartments so that any reformed NaOH does not contact the deposited or depositing polymer.

In preparation of the polyamic acid salt electrodeposition composition, the component materials should be preferably employed in ratios to provide a saturated solution free of precipitates. The process for preparing the non-colloidal solution consists of (1) reacting an acid polymer in an organic solvent solution, which is preferably non-electrolizable, with a base to form an acid salt, (2) adding to the salt solution, a non-solvent for the polyamic acid salt which is substantially non-electrolizable, to provide the non-colloidal solution.

The preferred electrodeposition composition is formed by addition of 1 part by weight polyamic acid polymer, about 12.5–15.5 parts solvent for said acid, about 0.8–1.5 parts nitrogen containing base or an amount effective to convert the carboxyl groups into the salt and about 7–9 parts non-solvent for the salt of the acid. Under 12.5 parts solvent for the polymer, based on 1 part by weight acid, will cause viscosity problems and precipitation and over 15.5 parts solvent for the polymer will impede electrocoating because the polymer will stay in solution. Under 7 parts non-solvent for the acid salt will impede electrocoating because the polymer will stay dissolved in the vicinity of the anode. Over about 9 parts non-solvent for the acid salt will cause precipitation of the polymer within the two solvent medium. The acid salt may be separately formed and then added to the solvent or the solvent-nonsolvent mixture.

The critical balance of non-solvent to solvent just barely keeps the polymer-salt in solution. To form this composition in non-colloidal solution form, the non-solvent for the salt is added to the other ingredients (i.e. to the solvent containing the salt) and not vice versa. The electrodeposition composition of this invention will provide extremely uniform and even coatings for both flat and edge coverage, rather than either heavy or thin edge coverage, of coated flat conductors.

Significantly fewer problems exist when using this non-colloidal electrodeposition composition, since bath stability times are much greater, the composition is more conductive allowing use of lower potential differences, and polymer precipitation or agglomeration within the bath is minimized, when compared to equivalent colloidal systems. Substitution of any electrolizable compounds for the solvents or bases, such as water, methanol, ethanol, ammonium hydroxide and aqueous sodium or potassium hydroxide solution will cause pitting in the final electrodeposited film. However, it is to be understood that the term non-aqueous is meant to include trace amounts of water that might be picked up by the ingredients from the atmosphere. Water is not to be included as a substitution for any of the bases or solvents. Small effective amounts of filler particles, as such, or as finely divided pigments or lubricants can be added to the composition for a variety of end uses such as colored coated panels or thin antifriction films.

EXAMPLE 1

A non-colloidal electrodeposition composition was formed by: (1) mixing 33 grams of polyamic acid polymer dissolved in 179 grams of solvent for the polymer (200 ml. of a polyimide wire enamel solution having 16.5 wt.% solids content and sold commercially by DuPont under the trade name Pyre M. L. Polyimide Wire Enamel) with 329 grams (300 ml.) of dimethylsulfoxide solvent for the polymer; adding 29 grams (40 ml.) of triethylamine dropwise, to produce the amine salt with the free carboxyl groups present. The resulting solution, made from 0.9 parts by weight organic amine and 15 parts by weight combined solvent for the polymer to 1 part acid polymer, was vigorously stirred, heated to about 40°C., and held at that temperature for 20 minutes. (2) To this solution was added slowly with vigorous stirring 236 grams (300 ml.) of acetone, a non-solvent for the acid salt, to provide an essentially saturated composition containing 7 parts by weight non-solvent for the acid salt to 1 part acid polymer. In a preliminary test, the amount of acetone needed for saturation was determined by a titration technique of adding acetone slowly to the salt solution until precipitation was achieved at 302 ml. of acetone. In this Example 300 ml. of acetone was added to achieve complete saturation without precipitation.

About 300 mil. of this electrodeposition composition, having a pH of about 8–9, was added to a 7×7×5 inch Pyrex glass trough with two 6×4×0.02 inch copper electrodes (anode and cathode) connected to a variable voltage d.c. power supply. The anode to cathode separation through the electrodeposition composition was 1½ inch. A potential difference of 90 volts was applied for one minute. Under the influence of the electric field it is envisaged that the salt ionizes to produce the triethylammonium ion and carboxyl ion of the polymer, which subsequently migrate to cathode and anode respectively. During this time the current decreased from an initial value of 700 mA. to 250 mA. and produced an adherent coating on the anode without any gassing of the composition. Current densities varied in the range between 2.5–7 mA./sq. in. of electrode surface.

The coated electrode was removed from the bath and slowly heated from 50°to 350°C. in a convection oven over a period of 45 minutes to imidize or cyclize the polymeric deposit. A very tough, pinhole free, flexible, uniform film coating with good edge coverage one mil. thick (0.001 inch) was produced. Increased electrolysis times produced thicker coatings up to 3.0 mils. There was no necessity to stir the composition even for electrolysis times over 30 minutes and no precipitation or agglomeration of the resin was seen. The composition could be stored up to 3 weeks without loss of stability. The resin content of the bath could be completely depleted without showing any adverse effects on the properties of the final coating.

Similar films have been produced on aluminum, copper, nickel, iron, zinc, titanium, lead, tin, stainless steel and platinum electrodes using dimethylacetamide and 1-methylimidazole.

A variety of tests were run on 1 mil. thick aluminum electrodes having an area of 40 sq. in. and a polyimide coating, applied by the method of this invention, having a thickness between about 0.7 and 1.1 mils. Determinations were made of the breakdown voltages at various positions on one of these electrodes by connecting the electrode to ground and positioning a rounded 1 inch electrode on the film surface. A 60 Hz power supply was employed to perform dielectric strength tests in accordance with ASTM Standard test D149. The d.c. potential difference between the grounded plate and rounded electrode was increased until breakdown occurred. The dielectric breakdown values obtained were in the 2.5 to 5.5 KV/mil. range with an average value of 4.0 KV/mil.

A standard Conical Mandrel test was performed on a polyimide coated aluminum electrode. The coating showed no cracking or loss of adhesion down to a 1/16 inch bend. Thermal aging tests on a polyimide coated aluminum electrode in accordance with AIEE Method 57 showed an expected life of greater than 10,000 hours at 250°C. and folding endurance tests in accordance with ASTM Standard test D-2176-63T showed a value of 30,000 cycles at 25°C on the stripped polyimide film. Insulation resistance of the coating is infinite when dry and about $5 \times 10^5$ megohms after boiling for 10 minutes in water. These tests indicate that the films produced by the method of this invention compare very favorably with solution cast polyimide films which generally have dielectric strengths of 3.4 KV/mil. and thermal lives of about 20,000 hours at 250°C.

Other polyimide resin precursors have also been used as a substitute for the Pyre M. L. Excellent results have been achieved with polypyromellitamic acid precursor solutions formed by condensation of pyromellitic dianhydride with 3, 4'-diaminobenzanilide in stoichiometric proportions in dimethylacetamide as solvent for the polymer, to form a solution having a solids content of about 18 wt.% at a 2–3 Gardner Holt viscosity at 25°C. Small amounts of pigments and finely divided solid lubricants have also been included in these compositions. The cured resin has also been stripped from the metal to given flexible and creasable films that could find use in a variety of applications.

EXAMPLE 2

A non-colloidal electrodeposition composition was formed with Pyre M. L. exactly as in EXAMPLE 1, except that 41.5 grams (40 ml.) of 1-methylimidazole was substituted for the triethylamine. The composition was added to a 12×8×4 inch rectangular stainless steel tank. The tank was made the cathode while the anode was a degreased 6-inch copper hexagonal form-wound coil which was centrally immersed in the composition described above. A potential difference of 10 volts (1300 mA.) was applied for a period of 1 minute. The coil was removed from the bath and heat-cured or imidized in a convection oven as in EXAMPLE 1. This produced a continuous, smooth, pinhole free, polyimide coating 1 mil. thick on the irregular shaped coil with uniform flat surface and edge coverage. An apparent dielectric strength of 1,900 volts was obtained when the coil was completely immersed in mercury and subjected to a potential (60 Hz power supply) increasing at 500 volts/sec.

Electrodeposited polyimide films retain their mechanical and physical properties over a wide temperature range. This ability proves itself especially useful in applications which have high operating temperatures.

I found that when the acetone component of the composition was replaced by water, which will electrolize, the coatings that are formed do not adhere very well and are heavily pitted, even when very low potential differences are applied, due to water electrolysis (gaseous products) at the anode, making the coatings disadvantageous for electrical applications in contrast to the coatings of EXAMPLES 1 and 2.

The critical feature of my discovery, which has enabled me to electrodeposit a polyamic acid salt, is the requirement of an essential balance between the solvent and non-solvent in the composition. The polyamic acid salt cannot be deposited from a dilute solution where only a solvent (e.g., dimethylacetamide and/or dimethylsulfoxide) is employed. The solvent is capable of redissolving any deposited film of polyamic salt and, indeed, is capable of redissolving a highly concentrated polyamic salt solution at the anode interface. Either of these redissolutions can preclude any effective deposition. If, however, the power of the solvent is reduced by the addition of a non-solvent so the redissolution is prevented, effective deposition does occur.

Enough non-solvent must be added to make the bath incapable of redissolving polyamic acid, care being exercised to avoid the formation of a colloid by adding too much non-solvent. This critical balance between solvent and non-solvent can be determined by a simple titration, i.e., the measured incremental addition of non-solvent to a measured amount of solution of known concentration, to an end point where precipitation or colloid formation first occurs. A smaller incremental proportion of the non-solvent is then used to form an essentially saturated solution of the polymeric salt (in the solvent and non-solvent) as the starting bath. That proportional balance is suitable even for lower overall concentrations of polymeric salt in the bath because the salt is concentrated at the anode before it is deposited.

It should be noted that in EXAMPLE 1, electrodeposition continued until the bath was completely depleted. It would, however, be desirable, in a continuous large scale process, to add polyamic acid salt as it is depleted. This could be added as the solid, so that the solvent — non-solvent balance is maintained. Additions of solvent or non-solvent may be made, but it must not materially affect the balance in the bath. Frequent additions of the salt will provide the most efficient operation, because the deposition from an essentially saturated solution will require the least amount of electrical energy. The closer the bath is to a precipitable state, the less energy it takes to deposit the polymeric molecules.

The most desirable initial concentration of about 5 weight percent of polyamic acid based on the total weight of polyamic salt and the two miscible liquids was determined by trial to provide a conductive solution with a sufficiently low viscosity to enable the molecules to move through the liquid and concentrate at and deposit upon the anode in a rapid manner at voltages and currents that will neither decompose nor overheat the liquids. The solvent to non-solvent balance is designed on the basis of an essentially saturated initial polymeric salt solution. Deposition will, however, continue at a diminishing rate as the salt in solution is depleted. Lower initial concentrations, below saturation, may be employed but the most rapid deposition rates would be sacrificed.

While the foregoing description is primarily directed to polyamic acids, it should be understood that the critical feature of adding enough non-solvent to the solvent, to provide the proportional ratio that would be employed in making an initial essentially saturated solution, is useful with salts of other carboxyl containing polymers and, indeed, with other polymers in general that are sufficiently chargeable, conductive and mobile in solutions to be electrodeposited. Such a proportional ratio would have a solvency power sufficiently limited to prevent the redissolution of the deposited film and/or the concentrated solution at the anode interface. That particular proportional ratio of solvent to non-solvent would initially contain the maximum amount of polymer that could be dissolved therein without precipitation (i.e., essentially saturated) to take advantage of the most rapid deposition rates. Lower amounts or concentrations of polymer could be used, but again, the rapid deposition rates would be sacrificed.

It should be understood that the prevention of redissolution of the polymeric deposit and the redissolution of the concentrated solution at the anode interface is essential. It is particularly difficult, if not impossible, to directly measure and set solvency parameters for the latter phenomenon. It is, however, possible to set these parameters by adjusting the non-solvent to solvent ratio on the basis of essential saturation, knowing that this will provide effective electrodeposition with polymers that was not heretofore possible

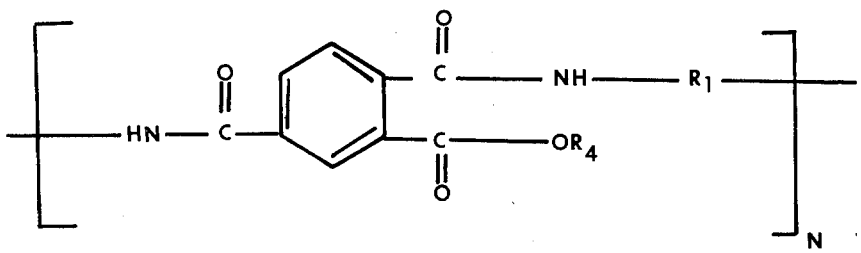

I claim:

1. A method of making a resinous electrodeposition composition comprising the steps of:
   A. providing a resinous salt comprising the reaction product of a polyamic acid and an organic nitrogen containing base selected from the group consisting of imidazoles and tertiary amines in a non-aqueous, organic, aprotic solvent for the salt,
   B. adding to the salt in solution, a non-aqueous, organic, non-electrolizable, non-solvent for the salt in an amount effective to provide an essentially saturated solution containing the resinous salt, said solution being electrically conducting.

2. The method of claim 1, wherein the electrodeposition composition has a pH between 8–10, a solids content between about 0.5 and about 5 wt.% based on the weight of polyamic acid and total solvent-non-solvent mixture, the solvent for the salt is an aprotic solvent and the non-solvent for the salt is a ketone.

3. A method of making a non-aqueous polyamic acid electrodeposition composition comprising the steps of:
   A. making a salt by mixing
      1. a solution of 1 part by weight polyamic acid in about 12.5–15.5 parts by weight of a non-aqueous, organic aprotic solvent for the acid with
      2. A nitrogen containing base selected from the group consisting of imidazoles and tertiary amines, in an amount effective to form an organic salt;
   B. adding to the salt, about 7–9 parts by weight of a non-aqueous, organic, non-electrolizable, non-solvent for the salt, to provide a solution of salt within the solvent mixture, the composition having a solids content between about 0.5 and about 5 wt.% based on the weight of polyamic acid and total solvent-non-solvent mixture.

4. The method of claim 3 wherein the nitrogen containing base is selected from the group consisting of imidazoles and tertiary amines, the non-solvent for the salt is a ketone, the organic solvent for the acid is nonelectrolizable and the composition has a pH between 8–10.

5. The method of claim 4 wherein the nitrogen containing base is selected from the group consisting of trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmorpholine, N,N-diethylaniline, pyridine, imidazole, 1-methylimidazole, 4-methylimidazole, 5-methylimidazole, 1-propylimidazole, 1,2-dimethylimidazole, 1-ethyl-2-methylimidazole and 1-phenylimidazole and the non-solvent for the salt is selected from the group of ketones consisting of acetone, methyl isobutyl ketone, methyl ethyl ketone, methyl n-propyl ketone, diethyl ketone, mesityl oxide, cyclohexanone, methyl-n-butyl ketone, ethyl-n-butyl ketone, methyl-n-amyl ketone, acetophenone, methyl-n-hexyl ketone, isophorone and diisobutyl ketone.

6. A conductive polymeric solution comprising a salt of a carboxyl containing polymer and a miscible liquid system containing (1) a non-aqueous, organic, aprotic solvent for the polymer and (2) a non-aqueous, organic non-solvent for the polymer, the solvent and non-solvent being proportioned so that an initial concentration of polymer in the miscible system would provide an essentially saturated solution, the polymer being dissolved in said system in an amount not exceeding the initial concentration and said polymer being sufficiently chargeable, conductive, and mobile in said solution to be electrodeposited.

7. The solution of claim 6 wherein the amount of polymer provides an essentially saturated solution.

8. The solution of claim 7 wherein the polymer is a salt of an amic acid polymer.

9. The solution of claim 8 wherein the salt is an organic salt.

10. A non-aqueous polyamic acid electrodeposition composition, comprising a solution of acid salt within a solvent mixture, said acid salt being the reaction product of 1 part by weight polyamic acid and a nitrogen containing base selected from the group consisting of imidazoles and tertiary amines, and said solvent mixture comprising about 12.5–15.5 parts by weight of a non-aqueous, organic aprotic solvent for the acid and about 7–9 parts by weight of a non-aqueous, organic, non-electrolizable non-solvent for the salt, the composition having a solids content between about 0.5 and about 5 wt.% based on the weight of polyamic acid and total solvent-non-solvent mixture.

11. The composition of claim 10 wherein the nitrogen containing base is selected from the group consisting of imidazoles and tertiary amines, the non-solvent for the salt is a ketone, the organic solvent for the acid is non-electrolizable and the composition has a pH between 8–10.

12. The composition of claim 11 wherein the nitrogen containing base is selected from the group consisting of trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N, N-diethyl-p-toluidine, N-allylmorpholine, N,N-diethylaniline, pryidine, imidazole, 1-methylimidazole, 4-methylimidazole, 5-methylimidazole, 1-propylimidazole, 1,2-dimethylimidazole, 1-ethyl-2-methylimidazole and 1-phenylimidazole and the non-solvent for the salt is selected from the group of ketones consisting of acetone, methyl isobutyl ketone, methyl ethyl ketone, methyl n-propyl ketone, diethyl ketone, mesityl oxide, cyclohexanone, methyl-n-butyl ketone, ethyl-n-butyl ketone, methyl-n-amyl ketone, acetophenone, methyl-n-hexyl ketone, isophorone and di-isobutyl ketone.

13. The composition of claim 11 wherein the polyamic acid is selected from the group of polyamic acids having the structure:

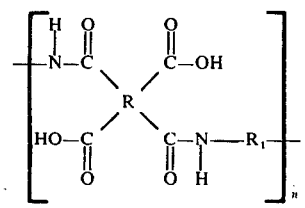

and mixtures of said amic acids, wherein n is at least 15, R is at least one tetravalent organic radical selected from the group consisting of:

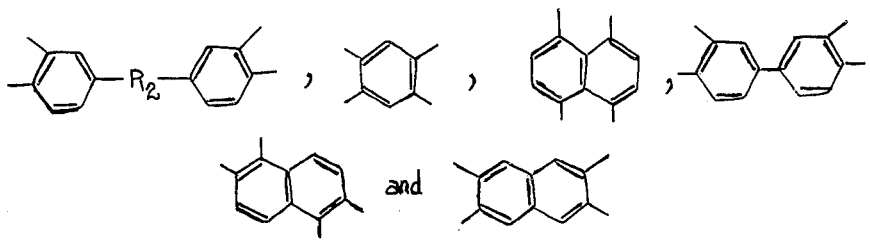

$R_2$ being selected from the group consisting of divalent aliphatic hydrocarbon radicals having from 1 to 4 carbon atoms and carbonyl, oxy, sulfo and sulfonyl radicals, $R_1$ is at least one divalent radical selected from the group consisting of:

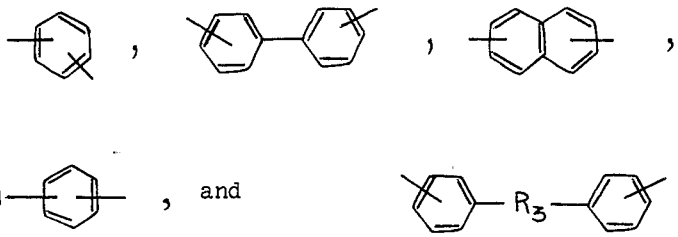

in which $R_3$ is a divalent organic radical selected from the group consisting of $R_2$, silico and amido radicals and in which $R_4$ is —H.

14. The composition of claim 13 wherein the solvent for the acid is selected from the group consisting of dimethyl acetamide, dimethyl formamide, N-methyl-2-pyrrolidone, dimethyl sulfoxide and pyridine and mixtures thereof.

15. The composition of claim 13 also containing filler particles.

16. The composition of claim 13 wherein the solvent for the acid is dimethyl sulfoxide and the nonsolvent for the salt is acetone.

* * * * *

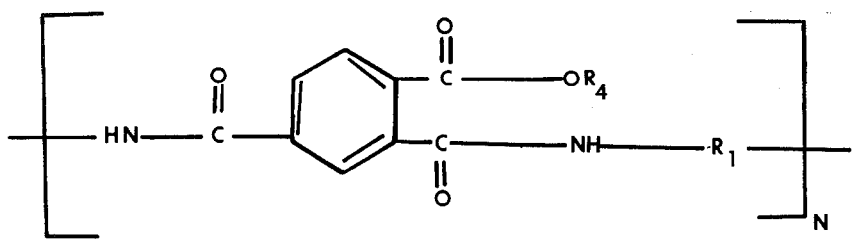

and